United States Patent

[11] 3,558,810

[72] Inventors Gildo Cecchin
Niles;
Francis H. Hilbert, River Grove, Ill.

[21] Appl. No. 797,973
[22] Filed Feb. 10, 1969
[45] Patented Jan. 26, 1971
[73] Assignee Motorola, Inc.
Franklin Park, Ill.
a corporation of Illinois

[54] COLOR TELEVISION SIGNAL DEMODULATION SYSTEM

18 Claims, 1 Drawing Fig.

[52] U.S. Cl. .......... 178/5.4
[51] Int. Cl. .......... H04n 9/50
[50] Field of Search .......... 178/5.4SD, 5.4(A); 329/50

[56] References Cited

UNITED STATES PATENTS

| | | | |
|---|---|---|---|
| 3,328,517 | 6/1967 | Davidse | 178/5.4SD |
| 3,405,229 | 10/1968 | Parker | 178/5.4SD |

*Primary Examiner*—Richard Murray
*Assistant Examiner*—George G. Stellar
*Attorney*—Mueller, Aichele & Rauner

ABSTRACT: A silicon monolithic integrated circuit consisting of three sets of full-wave, synchronous, switched demodulators is used to demodulate the red, blue and green color signals present in a composite television signal. Each of the demodulators consists of two pairs of switching transistors with the transistors in each of the pairs being rendered alternately conductive by a reference signal derived from the reference oscillator in a color television receiver. The phase of the red and the blue reference oscillator signals are obtained in a conventional manner, and the phase for the green reference signal is obtained by adding a predetermined portion of the red and blue signals together in a resistive adder to provide the green oscillator signal. The color signals are supplied in alternate phase to the two pairs of switching transistors in each of the demodulators, and the brightness signal components are applied equally or push-push to the switching transistors of the demodulators through an input transistor for each of the demodulators. In order to provide the proper relative amounts of gain for three demodulators, the red and blue signal demodulators have shunting resistance circuits connected across the input transistor circuits; and the green demodulator has a shunt connected across equal taps on voltage dividers connected to the outputs thereof. Since the brightness signal components are balanced with respect to the shut devices, the brightness signal passes through all of the demodulators unaffected by the shunting circuits.

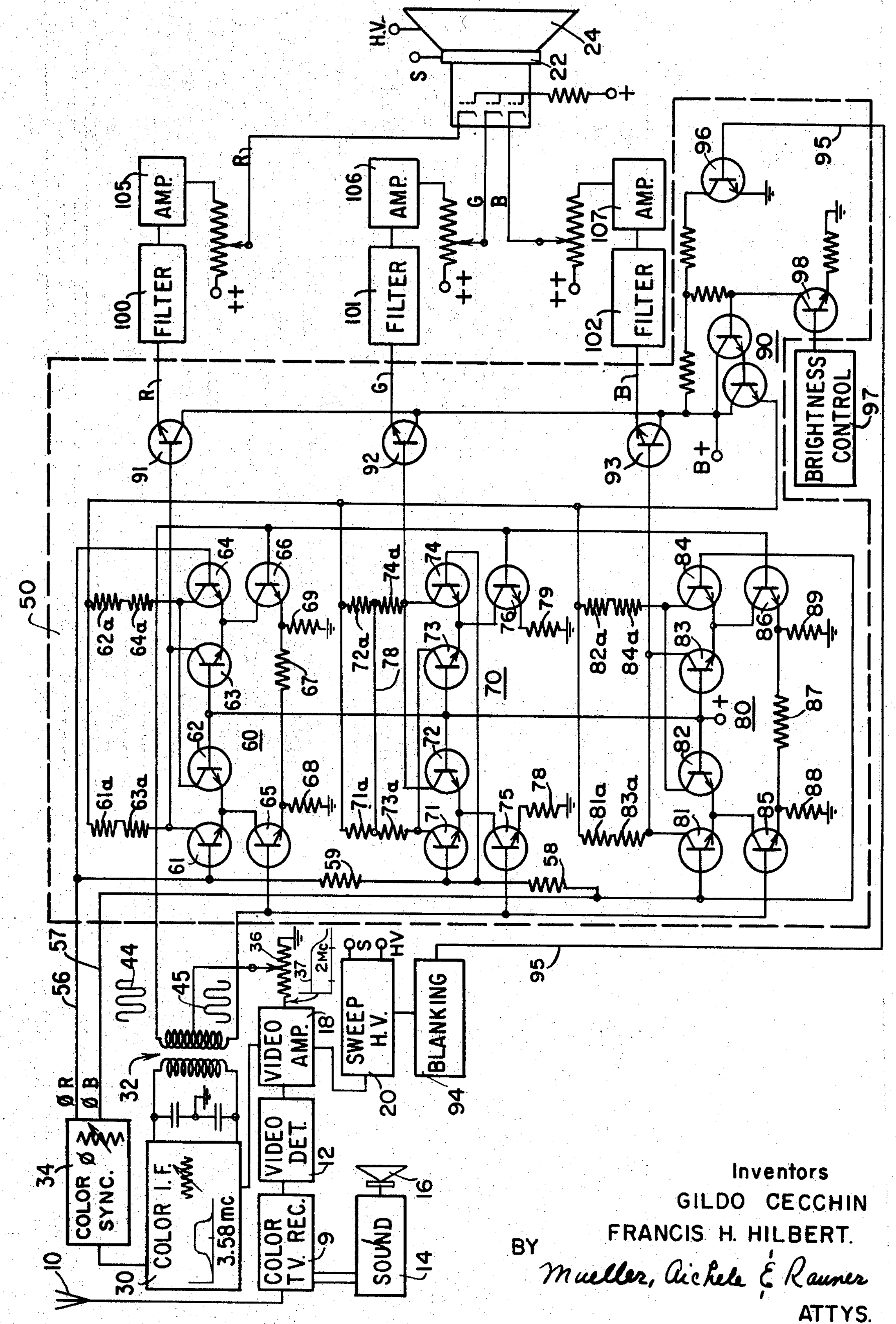
Inventors
GILDO CECCHIN
FRANCIS H. HILBERT
BY Mueller, Aichele & Rauner
ATTYS.

COLOR TELEVISION SIGNAL DEMODULATION SYSTEM

BACKGROUND OF THE INVENTION

In the manufacture of electronic devices, it is becoming increasingly desirable to utilize solid state components to the greatest extent possible in order to realize the advantages inherent in such components. This has resulted, in the color television field, in the use of discrete transistors as the active components in television receivers. Even the use of discrete transistors, however, results in a television receiver which is somewhat difficult and expensive to manufacture. Thus, it is desireable, insofar as possible, to reduce the complexity of the manufacture and simultaneously therewith to reduce the expense of a color television set by utilizing integrated circuit techniques for the circuits of a color television set.

One of the circuits in a color television set requiring a relatively large number of components is the color demodulator section of the set. This portion of the television set is used to separate the color signals present in the NTSC color television signal. This signal includes a wide band brightness or luminance (Y) signal and a modulated subcarrier signal of approximately 3.58 MHz. The subcarrier signal is phase and amplitude modulated by color difference signals (*r—y*, *b—y* and *g—y*), so that different phases of the subcarrier each represent the hue of an image portion and the subcarrier amplitude at that phase represents the saturation of that hue. A monochrome receiver visibly reproduces only the Y component.

Recently a color demodulator has been developed in which the brightness signal and the chrominance or modulated chroma subcarrier signal both are applied to separate demodulators each fed by a properly phased reference signal of subcarrier frequency for directly producing red, blue and green representative video signals, thereby avoiding separate recovery and combination of the brightness signal with the demodulated color difference signals. When the combined luminance and modulated chroma subcarrier signals are applied to such a direct demodulator, the ratio of the amplitude of the brightness signal to the chrominance signal supplied to each demodulator must be established, so that the demodulator can operate to produce a color representative signal without an unbalance of one portion or the other. In the past, step filters have been employed to accomplish this for certain kinds of demodulators, but these filters are expensive and difficult to construct for proper operation. In addition, filters of this type do not readily lend themselves to integrated circuit technology.

SUMMARY OF THE INVENTION

An object of this invention is to provide an improved synchronous direct color demodulator.

Another object of this invention is to apply full level brightness signals and a selected amplitude of opposite phases of a color modulated subcarrier to an integrated circuit direct demodulator for producing a color representative signal.

A further object of this invention is to provide the reference or switching signals for a third one of three color demodulators by combining a predetermined portion of the reference signals supplied at different phases to the other two demodulators in an adder circuit in order to provide the reference signal for the third demodulator circuit.

A preferred embodiment of this demodulation system includes a plurality of individual, synchronous, gated, full-wave demodulators for directly producing color representative video signals. Each of the demodulators is controlled by a color reference signal having a phase associated with a particular color. Two pairs of switch devices are provided in each demodulator section; and the switch devices of each pair are alternately rendered conductive, with one of the switch devices in each pair being simultaneously rendered conductive with a corresponding switch device in the other pair. The switch devices are fed the brightness signal through parallel paths, with the signal being applied to a signal input device for each of the pairs in each of the demodulators. Opposite phases of the chrominance signal are respectively fed to the input devices for each of the demodulators. A shunt impedance is connected across the inputs to some of the demodulators to provide selected amplitudes of chroma subcarrier with respect to the brightness signal level. At least one other of the demodulators has a shunt connected across the outputs thereof to provide a selected amplitude of chroma subcarrier with respect to the brightness signal level in that demodulator. The shunt networks are used with each demodulator section to compensate for the different levels of color difference signals represented in the subcarrier in the compatible NTSC signal demodulated by the system.

The switch devices are operated by a reference signal which is applied at different phases to each of the switch devices. The reference signal supplies two phases which are supplied to two of the demodulators, and the reference signal for the switch devices of a third demodulator is derived by adding a predetermined amplitude of each of the two phases of reference signal together to provide the desired third phase for the third demodulator.

BRIEF DESCRIPTION OF THE DRAWING

The sole FIG. of the drawing is a circuit diagram, partially in block form, of a television receiver incorporating a color demodulator in accordance with a preferred embodiment of the invention.

DETAILED DESCRIPTION

Referring now to the drawing, a color television receiver 9 is coupled to a suitable antenna 10 to receive a signal and to select, amplify and convert it to IF frequency for application to a video detector 12. In addition, the color receiver circuit 9 also is coupled to a sound system 14 which demodulates and amplifies the usual 4.5 MHz. sound subcarrier to be reproduced by a speaker 16 as audio signals.

The video detector 12 is coupled to a video amplifier 18 having outputs to the various remaining stages of the receiver. The horizontal and vertical beam synchronizing pulses of the signal are selected by a sweep and high voltage system 20 which has an output (S) coupled to the deflection yoke 22 on the neck of a three beam cathode ray tube 24. The system 20 also provides a high voltage (H.V.) output for the screen of the shadow mask of the cathode ray tube 24. The video amplifier 18 is further coupled to a color subcarrier IF amplifier 30 which includes band pass filter networks for selecting the color subcarrier at 3.58 MHz. and its associated side bands. The amplifier 30 includes a gain or color intensity control to furnish a selected amplitude of the chroma subcarrier signal of opposite phases with respect to ground at the primary winding of a transformer 32.

In addition the color IF amplifier 30 is further coupled to a color synchronizing oscillator 34 which selects the burst signals appearing on the "back porch" of the horizontal synchronizing pulses in order to develop a color reference signal of 3.58 MHz. for synchronous demodulation of the color signals. The oscillator 34 also has a control for shifting the phases of the two different output signals produced, thereby shifting the demodulation angle slightly and affording a color shift in the reproduced image.

The video amplifier 18 also includes a variable contrast control 36 across a selected portion of which the wide band composite signal is developed with respect to ground to be applied to the center tap of the secondary winding of the transformer 32. The luminance or brightness signal available at the control 36 may extend in frequency range 37 up to or into the chroma subcarrier side bands.

The secondary winding of the transformer 32 has one output lead 40 and a second output lead 41, with both of these leads carrying the same brightness component with respect to ground. The lead 40 carries the modulated chroma subcarrier 44 of one phase and the lead 41 carries the modulated chroma subcarrier 45 of opposite phase, with the signals 44 and 45 being phase-modulated to represent hue and being amplitude modulated to represent saturation. Each of the leads 40 and 41 are coupled to three synchronous, gated integrated circuit color demodulators 60, 70 and 80 located on an integrated circuit chip 50 which is indicated by dotted lines in the drawing. Output signals obtained from the color demodulators 60, 70 and 80 are supplied through associated filters 100, 101 and 102, respectively, to video output amplifiers 105, 106 and 107, at the output of which the video signals representing red, green and blue are developed. Each of the amplifiers 105, 106 and 107 includes a variable resistor coupled to a cathode of the three beam cathode ray tube 24, with the cathodes being part of the red, green and blue electron guns in the picture tube 24. Associated grids of these cathodes are coupled to a suitable bias source, and the tube 24 operates in accordance with known shadow mask principles to reproduce a monochrome or full color image in accordance with the video drive signals applied to it.

In the receiver generally described thus far there may be further circuitry which is known, but which has not been disclosed in detail in order to simplify the disclosure. For example there can be a gated automatic gain control system, a color killer system for interrupting the amplifier 30 in the absence of the color signal, as well as other circuitry now known in commercially produced color television receivers. It should further be noted that it is preferable for the video detector 12 to be direct current coupled through all of the succeeding amplifiers and demodulators directly to the cathodes of the picture tube 24 in order to maintain constant the DC component of the signals processed in the various translation paths.

Referring now more particularly to the integrated circuit color demodulator system 50 shown in the drawing, the three gated synchronous full-wave demodulators 60, 70 and 80 all are substantially the same, including two pairs of switching transistors 61 and 62 and 63 and 64 in the demodulator 60 and two input transistors 65 and 66 in the demodulator 60. Similarly numbered switching transistors and input transistors are found in the demodulators 70 and 80; and for the purposes of explaining the operation of the demodulators, the description will be limited to the demodulators 60. It should be understood, however, that the description of the operation of the demodulator 60 applies equally as well to the operation of the demodulators 70 and 80. The color reference signal derived from the oscillator 34 is applied over a lead 56 to the bases of the switching transistors 61 and 64, and the bases of the switching transistors 62 and 63 are connected to a suitable source of positive DC biasing potential. Collector potential for the transistors 61, 63 and 62, 64 is supplied, respectively, through collector resistors 61*a*, 63*a* and 62*a*, 64*a* from an output transistor 90 in an automatic brightness circuit, the operation of which will be described subsequently. The emitters of the transistors 61 and 62 are connected together and to the collector of the input transistor 65, whereas the emitters of the transistors 63 and 64 are connected together and to the collector of the input transistor 66.

The reference frequency signals obtained from the oscillator 34 on one half-cycle of the reference signal, render the transistors 61 and 64 conductive, while at the same time causing the transistors 62 and 63 to be driven nonconductive, and, on the next half-cycle of the reference signal, drive the transistors 61 and 64 nonconductive while the transistors 62 and 63 are rendered conductive. This operation occurs for each cycle of operation of the signal obtained from the oscillator 34, so that the transistors 61, 62 and 63, 64 in each of the pairs of the switching circuits of the demodulator 60 are alternately rendered conductive.

The input transistor 65 is supplied with the modulated subcarrier signal 45 and the input signal transistor 66 is supplied with the opposite-phase modulated subcarrier signal 44, while both of the input transistors 65 and 66 are supplied with the same phase of the brightness signal 37 present at the center tap of the secondary winding of the transformer 32. Since the frequency of the signals obtained from the output of oscillator 34 is chosen to be the same as the suppressed carrier for the modulated color signal, the modulators 60, 70 and 80 are operated as gated synchronous demodulators. The alternate symmetrical synchronous gating of the switching transistors, such as 61, 62, 63 and 64 in the demodulator 60, has the effect on the opposite phase chroma signals applied to the bases of the transistors 65 and 66 to provide a full wave recovery of the modulated information at the output terminals, with a pair of output terminals being available from each of the demodulators 60, 70 and 80. For example, transistors 61 and 63 have their collectors coupled together to provide a first one of these output terminals while the transistors 62 and 64 have their collectors coupled together to provide a second of these output terminals for the demodulator 60. Since the output signals available from each of the two output terminals of the demodulators are of opposite phase, the desired phase of output signal may be selected merely by choosing whichever of the two output terminals provide that desired phase.

While permitting the desired synchronous demodulation of the modulated subcarrier bearing the color or chrominance signal is obtained by the demodulators 60, 70 and 80 it should be noted that the application of the brightness or luminance signal 37 to the transistors 65, 66; 75, 76; or 85, 86 in a push-push fashion is not affected by the symmetrical synchronous gates acting on the signal obtained therefrom. As a consequence, the brightness input signal 37 is preserved at the output of the demodulators 60, 70 and 80 and is the same at both outputs thereof. This is due to the fact that in both inputs to the demodulator, the brightness signals is the same at all times with respect to the gating or switching of the transistors 61 through 64. Thus, irrespective of which of the switching transistors, such as transistors 61 through 64 is conductive at any moment, the same luminance or brightness signal component is being switched through to the output by that transistor. This is not true, however, of the chrominance signals which are applied to the bases of the transistors 65 and 66 in opposite phase relationships. Thus, if the chroma information is fed in opposite phases to alternately phased gates while the brightness information is fed common phase (push-push) to the same gates, superposition shows that the simultaneous occurrence of the $y$ (brightness) component in the output, together with the appropriate gate phase choices (relative to chroma subcarrier phase) results in: $y \pm k_r(r-y)$ and/or $y \pm k_b(b-y)$ and/or $y \pm k_g(g-y)$ and potentially, therefore, can result in $\pm r$, $\pm g$ and $\pm b$ with appropriate choices for the constants $k_y$, $k_b$, and $k_g$.

It should be noted that although all of the demodulators 60, 70 and 80 are operated in the same manner, the reference signal switching source supplied to the transistors 61—64, 71—74 and 81—84 is applied in a different relative phase relationship in order to effect recovery of the desired color signals. As indicated previously, the oscillator 34 provides outputs for the red and blue phase signals. The oscillator 34, however, need not supply a third phase signal for the green demodulator 70. The signals for driving the transistors 71 and 74 of the demodulator 70 may be derived from the signals present on the red output lead 56 and the blue output lead 57 from the oscillator 34 by coupling a predetermined amplitude of the signals present on each of these leads together to a common terminal used as the input to the switching transistors 71, 72, 73 and 74 of the demodulator 70. Thus, a portion of the signal present on the lead 57 is coupled through a resistor 58 to the bases of the transistors 71 and 74, and likewise a portion of the signal present on the lead 56 is coupled through a resistor 59 to the bases of the transistors 71 and 74. The values of the resistors 58 and 59 are chosen to add .35 of the blue amplitude on the lead 57 and .65 of the red amplitude on the lead 56 to produce the reference signal for the switching transistors 71—74. The desired $g-y$ output then is realized from the demodulator 70 by utilizing the "negative" demodulated output from the switching transistors 72 and 74. It will be noted that in the demodulators 60 and 80, the outputs are obtained from the odd-numbered transistors 61 and 63 and 81 and 83 respectively. The availability of the negative demodulated signal from the demodulator 70 eliminates the necessity for providing a 180° phase shift in the green gate drive or in the green gate output signal.

In order to adjust the relative amplitudes of the chrominance signal components in accordance with the NTSC standards, without varying the brightness component, the chrominance signal gain is controlled in the demodulators 60 and 80 by connecting a shunt resistor 67 or 87 between the emitters of the transistors 65 and 66 and the emitters of the transistors 85 and 86, respectively. Also in the demodulators 60 and 80, and in the demodulator 70, the emitters of the input transistors each are connected through equal emitter load resistors 68, 69; 78, 79; and 88, 89 to ground. In the demodulator 70, the chrominance signal gain is adjusted by providing a direct shunt 78 between the junctions of the collector resistors 71*a*, 73*a* and 72*a*, 74*a*. The resistors 67 and 87 adjust the differential gain of the transistors 65, 66 and 85, 86 respectively with respect to oppositely phased chrominance inputs applied to the bases of these input transistors in the demodulators 60 and 80. Larger gains for the input transistors 65, 66 or 85, 86 of the demodulators 60 and 80 are realized for small values of the resistances 67 and 87 and vice versa. A problem exists, however, in controlling all of the gain at the demodulator inputs with shunt resistors, such as the resistors 67 and 87, inasmuch as the gain on the blue demodulator 80, especially, would need to be increased so much that the inherent circuit imbalances due to the variations in gain of the individual transistors 85 and 86 would be substantially aggravated and could cause some degradation in the performance of the circuit. As a consequence, the relative adjustments of the gains of the three demodulator circuits are effected by using the shunt 78 across the collector resistors 71*a*, 73*a* and 72*a*, 74*a* at the outputs of the demodulator 70; and this shunt functions to attenuate or cancel some of the "out of phase" demodulated chrominance output signals without affecting the brightness or luminance output. Thus, a higher value resistance may be used in the shunts 67 and 87 to control the increase in the gains of the demodulators 60 and 80, while decreasing of the gain of the demodulator 70 is effected by the shunt 78 across the outputs thereof. The particular tapping points used for the shunt 78 and the particular values of the resistances 67 and 87 are interdependent and are adjusted to fix the relative demodulation gains for the red, green and blue demodulators 60, 70 and 80 to be approximately 17.7 times, 17.7 times and 5.3 times, respectively, for the push-pull chrominance drive. The shunt resistors 67 and 87 and the direct shunt 78 have no affect on the luminance signals, for the reason that the luminance component at both ends of each of these shunts is exactly of the same magnitude at all times; so that the shunt has no potential difference thereacross with respect to the luminance components obtained from the video amplifier.

The nature of the alternate gating or on-off gating used in the synchronous demodulators 60, 70 and 80 is such as to prevent the 3.58 reference signal components from appearing in the output, significantly reducing the trapping requirements of the demodulator circuits. In order to insure that this type of operation occurs, however, it is desirable that the current flowing in each of the paths for the switching devices in each of the demodulators be relatively closely matched. The most critical components in this regard on the integrated circuit chip on which the demodulator circuits are formed are the emitter resistors 68—69, 78—79, and 88—89 connected to the emitters of the transistors 65—66, 75—76 and 85—86. To assure 40 db. rejection of the gate drive signals, one percent resistor ratios are obtained by using 3 mil wide resistors to allow for mask alignment variations, etching variations, etc. The match of the input transistors such as 65 and 66 is not unduly critical, but the base source impedance should be kept relatively low for fast operation. The match of the gating transistors such as 61, 62, 63 and 64 is not a problem so long as sufficient gate drive is made available to switch these transistors fully on and off. The magnitude of the gate drive may be selected or adjusted in the oscillator circuit 34, and it should be noted that it should be sufficient to fully drive on and off the switching transistors 71, 72, 73 and 74 in the demodulator 70 since the drive signals for these transistors are obtained from a fraction of the magnitudes of the drive signals applied to the demodulators 60 and 70. Finally, in order to provide the most desirable operation of the demodulators, the load resistor match requirements for all three of the demodulators should be held to approximately 5 percent using 1 mil wide resistors.

The outputs of the demodulators 60 and 80 are obtained from the transistors 61—63 and 81—83 respectively and are applied through emitter followers 91 and 93 the outputs of which are supplied to the filter circuits 100 and 102, respectively. The output of the demodulator 70 for the green signal is obtained from the transistors 72 and 74 and is applied to the base of an emitter follower transistor 92, the output of which is supplied to the filter 101.

Horizontal and vertical retrace blanking functions may be incorporated into the design of the integrated circuit demodulator 50, and this has been implemented in the circuit shown in the drawing by reducing the supply voltage to the collectors of the switching transistors in the demodulators 60, 70 and 80 during the retrace periods. The blanking signals are obtained from the sweep circuit 20 and are indicated as being applied to a blanking output 94, supplying blanking signals over a lead 95 to the base of a normally nonconductive control transistor 96 the emitter of which is connected to ground. The output of the transistor 96 is connected to a Darlington loop amplifier 90 to normally provide the positive biasing potentials to the collectors of all of the switching transistors in the demodulators 60, 70 and 80. During the retrace operation of the sweep circuit 20, the blanking pulses applied through over the lead 95 to the base of the transistor 96 are sufficient to drive the transistor 96 into saturation. This in turn causes the Darlington amplifier 90 to become less conductive, thereby reducing the demodulator collector supply voltage sufficiently to provide blanking signals at the outputs of the emitter followers 91, 92 and 93.

Control of the background brightness of the output of the emitter followers 91, 92 and 93 also may be effected through a brightness control circuit 97 which may be of any suitable type and which controls the conduction of a transistor 98, the collector of which is connected to the Darlington amplifier 90 and the emitter of which is connected through a resistor to ground. Varying the bias potential from the brightness control 97 applied to the base of the transistor 98 causes the transistor 98 then in turn to vary the background brightness of the signals applied to the emitter followers 91, 92 and 93 through the Darlington amplifier 90. If the direct demodulation of the luminance or brightness signals were not utilized, the luminance signal also could be introduced at the base of the transistor 98.

From the foregoing, it may be seen that an effective synchronous, gated, color demodulator circuit for direct demodulation of color and brightness components is provided by the integrated circuit 50 shown in the drawing. The circuit provides for ready adjustment of the chrominance level amplitudes in the demodulators relative to one another and relative to the luminance signal and operates to pass the luminance signal directly through the demodulator without alteration, while at the same time providing for effective demodulation of the color components of the composite signal.

We claim:

1. A color television receiver for a signal comprising brightness signal components of a television image and a subcarrier signal modulated by color difference signals representing hue and saturation of the image at different phases of the subcarrier, and having a reference oscillator providing reference signals at the subcarrier frequency and at different phases, said receiver including in combination:

a plurality of full wave demodulators, each including two pairs of switching devices, with each of the switching devices from one pair in each demodulator coupled in a common output with a different one of the switching devices from the other pair in the same demodulator;

means for supplying said reference signals at the subcarrier frequency and at different phases to the demodulators, with the common-connected switching devices of each demodulator being alternately rendered conductive at the subcarrier frequency for providing normal and inverted output signals representing a different color from each of the demodulator devices;

first means applying the brightness signal and the modulated subcarrier signal of one phase to one of the pairs of switching devices in each demodulator; and second means applying the brightness signal and the modulated subcarrier signal of opposite phase to the other of the pairs of switching devices in each of the demodulators.

2. The combination according to claim 1 wherein each of the demodulators includes two paths carrying the subcarrier signal, each of the paths including different ones of the applying means, switching devices and outputs from the switching devices, with the two paths in each of the demodulators carrying subcarrier signals of opposite phases, and further including means for cross-coupling the paths to attenuate the out-of-phase subcarrier signals.

3. The combination of claim 2 wherein the cross-coupling means includes an impedance for attenuating the demodulated subcarrier signal.

4. The combination of claim 1 further including a shunt impedance connected between the first and second signal applying means of at least one of the demodulators to form a subcarrier signal divider therewith for altering the gain of demodulated subcarrier signal appearing at the outputs of the switching devices of that demodulator with respect to the level of the brightness signal components; and shunting means connected between the outputs of at least one of the demodulators for adjusting the amplitude of the demodulated subcarrier signal appearing at the outputs of the demodulator having the shunt connected across the outputs while allowing the brightness signal components to be developed at those outputs in an unadjusted form.

5. The combination according to claim 4 wherein the shunt impedance and the shunting means are connected to different demodulators.

6. The combination of claim 1 wherein the switching devices are integrated circuit transistors of the same conductivity type.

7. A color demodulator for demodulating a television signal comprising brightness signal components of a television image and a subcarrier signal modulated by color difference signals representing hue and saturation of the image at different phases of the subcarrier, the ratio of subcarrier signal with respect to brightness signal components being different for image portions of different hue, said demodulator including in combination:

two switching means, each including first and second switching devices, with the outputs of the first device of each switching means and the second device of the other switching means being connected together to form two outputs, respectively, with the first and second switching devices in each switching means being adapted for alternate switching in response to a reference signal, the first device being nonconductive when the second device is conductive and vice versa;

means for applying a reference signal at the subcarrier frequency to the switching devices;

a first signal supply circuit for providing the subcarrier signal at one phase and the brightness signal components to one of the switching means;

a second signal supply circuit providing the subcarrier signal at opposite phase and the brightness signal components to the second switching means; and shunting means connected across the outputs for altering the gain of the subcarrier signals while permitting the brightness signal components to be passed to the outputs of the switching means unaltered in gain.

8. The combination of claim 7 wherein the shunting means is a resistance means.

9. The combination according to claim 7 further including a second demodulator having first and second switching means each including first and second switching devices with the outputs of the first switching device of each switching means and the second device of the other switching means being connected together to form two outputs, with the reference signal, the subcarrier signal, and the brightness signal components being supplied to the second demodulator circuit in the same manner as they are supplied to the first demodulator circuit and wherein a shunt impedance is connected between the first and second inputs to the second demodulator from the first and second supply circuits to form a subcarrier signal divider to adjust the gain of the second demodulator for the subcarrier signal with respect to the level of the brightness signal components.

10. The combination of claim 9 wherein the first and second signal applying means are input transistors, with a different input transistor supplying the signals to each pair of switching devices.

11. The combination according to claim 7 wherein the first and second switching devices in each of the switching means include transistors driven between conduction and cutoff by the reference signal means.

12. In a color television receiver for a signal comprising brightness signal components of a television image and a subcarrier signal modulated by color difference signals representing hue and saturation of the image at different phases of the subcarrier, a plurality of demodulating circuits for demodulating each of the different phases of the subcarrier signal including in combination:

means for supplying signals at the subcarrier frequency to the inputs of at least two of the demodulators, said supplied signals being of different phases to provide output signals representing different colors from each of the demodulators; and an adder circuit connected between the inputs to said two demodulators to provide at the output thereof a signal at the subcarrier frequency from the signal supplying means, with said signal being supplied to a third demodulator for operating that demodulator at the subcarrier frequency to provide a signal representing a third color.

13. The combination of claim 12 wherein the supplied signal is a reference signal which is supplied to the first and second demodulators at first and second phases thereof; and wherein a predetermined amplitude of the first and second phases of the reference signal is combined in the adder circuit to provide the reference signal supplied to a third of said demodulators; and further wherein each of said demodulators is a full wave synchronous demodulator with the output of said third demodulator being obtained 180° out of phase with the outputs obtained from the first and second demodulators.

14. The combination according to claim 13 wherein the first and second demodulators are red and blue signal demodulators, respectively, and wherein the third demodulator is the green signal demodulator.

15. The combination of claim 14 wherein different percentages of the red and blue reference signals are combined to form the green reference signals.

16. A color demodulator for demodulating a television signal comprising brightness signal components of a television image and a subcarrier signal modulated by color difference signals representing hue and saturation of the image at different phases of the subcarrier, the ratio of the subcarrier signal with respect to brightness signal components being different for image portions of different hue, said demodulator including in combination:

two switching means, each including first and second switching devices, with the outputs of the first device of one switching means and the second device of the other switching means being connected together to form two outputs respectively, the first and second switching devices in each switching means being adapted for alternate switching in response to a reference signal, and the first device being nonconductive when the second device is conductive and vice versa means for applying a reference signal at the subcarrier frequency to the switching devices;

a first signal supply circuit for providing the subcarrier signal at one phase to one of the switching means;

a second signal supply circuit providing the subcarrier signal at opposite phase to the second of the switching means;

said first signal supply circuit and the switching devices interconnecting that signal supply circuit with one of the outputs at any instant providing a first signal path, and the second signal supply circuit and the switching devices interconnecting that supply circuit with the other of the outputs at any instant providing a second signal path; and shunting means connected across the first and second signal paths for attenuating the outputs of the switching devices with respect to the subcarrier signals.

17. Apparatus according to claim 16 wherein the shunting means is connected across the outputs.

18. Apparatus of the type according to claim 16 further including a plurality of demodulators wherein the shunting means of at least one of the demodulators is connected across the outputs and wherein the shunting means of at least one of the other demodulators is connected across the first and second signal supply circuits.